United States Patent
Michael

[19]

[11] Patent Number: 5,872,870
[45] Date of Patent: Feb. 16, 1999

[54] MACHINE VISION METHODS FOR IDENTIFYING EXTREMA OF OBJECTS IN ROTATED REFERENCE FRAMES

[75] Inventor: David Michael, Newton, Mass.

[73] Assignee: Cognex Corporation, Natick, Mass.

[21] Appl. No.: 603,286

[22] Filed: Feb. 16, 1996

[51] Int. Cl.[6] ............................................ G06K 9/36
[52] U.S. Cl. .................... 382/291; 382/288; 382/289; 382/174
[58] Field of Search .................... 382/171, 174, 382/183, 288, 289, 292, 199, 291, 204, 203

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,435,837 | 3/1984 | Abernathy ................................ 340/146 |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,776,027 | 10/1988 | Hisano et al. ................................ 382/23 |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |

(List continued on next page.)

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communication of the ACM 24:563–573.

(List continued on next page.)

*Primary Examiner*—Phuoc Tran
*Attorney, Agent, or Firm*—David J. Powsner; Russ Weinzimmer

[57] ABSTRACT

A method for determining extrema of an object with respect to a reference frame that is rotated in comparison to that of the image and the equipment that acquired it is characterized by the steps of taking a first projection of the object with respect to an axis of a coordinaate system that is rotated with respect to the reference frame of the acquisition equipment, identifying in that projection locations representing extrema of the object, and outputting those locations as indicative of the extrema with respect to the axis.

27 Claims, 3 Drawing Sheets

U.S. PATENT DOCUMENTS

| | | |
|---|---|---|
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,912,559 | 3/1990 | Ariyoshi et al. .................. 358/261 |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Erjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,528,703 | 6/1996 | Lee .................................. 382/6 |
| 5,532,739 | 7/1996 | Garakani et al. . |
| 5,550,763 | 8/1996 | Michael . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |

OTHER PUBLICATIONS

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "PictureTel System 1000: Complete Videoconferencing for Cost Sensitive Applications," 4 pp. (1993).

PictureTel Corporation Product Brochure, "PictureTel System 4000(tm) A Family of Models to fit Your Application from Offices to Boardrooms, Classrooms and Auditoriums," 4 pp. (1993).

Symantec Corporation, "The Norton pcAnywhere User's Guide," Table of Contents 8 pp; Introduction of pcAnywhere Technology pp. i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robert Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

Horn, Berthold Klaus Paul. *Robot Vision*. The Massachusetts Institute of Technology, 1986.

MACHINE VISION METHODS FOR IDENTIFYING EXTREMA OF OBJECTS IN ROTATED REFERENCE FRAMES

RESERVATION OF COPYRIGHT

The disclosure of this patent document contains material which is subject to copyright protection. The owner thereof has no objection to facsimile reproduction by anyone of the patent document or of the patent disclosure, as it appears in the U.S. Patent and Trademark Office patent file or records, but otherwise reserves all rights under copyright law.

BACKGROUND OF THE INVENTION

The invention pertains to machine vision and, more particularly, to methods for identifying extrema of objects in rotated coordinate frames.

In automated manufacturing, it is often important to determine the location, shape, size and/or angular orientation of an object being processed or assembled. For example, in automated circuit assembly, the precise location of a printed circuit board must be determined before conductive leads can be soldered to it.

Among the important characteristics of an object are the extreme pixels, or extrema, in an image showing the object. The extrema are typically defined as the leftmost, rightmost, uppermost and lowermost points of the object with respect to the reference frame of the image. Together, these points define a rectangle, or bounding box, that wholly encompasses the object. The bounding box is often used to confine the region of the image that must be analyzed to identify detailed characteristics of the object. For example, in an image of multiple semiconductor chips, a bounding box can be used to limit a search for defects in one of them.

Many automated manufacturing systems use the machine vision technique of "blob analysis" to determine geometric properties of an object in an image, such as its angular orientation (or principal moments) and its extrema. A shortcoming of conventional blob analysis techniques is their dependence on the reference frame of the image (which, in turn, is dependent on the reference frame of the image acquisition equipment). This dependence causes the techniques to report large bounding boxes for objects that are rotated with respect to that reference frame. In images with multiple adjacent rotated objects, each bounding box may include an object and portions of its neighbors. This confounds attempts to analyze each object separately.

Prior art attempts to find extrema of objects with respect to rotated reference frames, e.g., as defined by the angular orientation of the objects themselves, have proven unduly time consuming. Typically, these attempts involve applying a conventional blob analysis tool in order to find the principal axes of the object, rotating the image to counter the object's rotation, reapplying the blob analysis tool to find the extrema of the object in the rotated image. Since image rotation is a slow operation, finding the smallest bounding boxes aligned to an object can take an excessively long time.

An object of this invention is to provide improved methods for machine vision and, more particularly, improved methods for identifying extrema of objects in an image.

Still more particularly, an object of the invention is to provide machine vision methods for finding extrema of an object with respect to a rotated reference frame.

Other objects of the invention include providing such machine vision methods as can be readily implemented on existing machine vision processing equipment.

Still other objects are to provide such methods as can be implemented for rapid execution and without excessive consumption of computational power.

SUMMARY OF THE INVENTION

The foregoing objects are attained by the invention which provides, in one aspect, a method for determining extrema of an object with respect to a reference frame that is rotated in comparison to that of the image and the equipment that acquired it.

The method is characterized by the steps of taking a first projection of the object with respect to an axis of a coordinate system that is rotated with respect to the reference frame of the acquisition equipment, identifying in that projection locations representing extrema of the object, and outputting those locations as indicative of the extrema with respect to the axis. In a related aspect, the invention provides for identification of extrema with respect to a second axis of the rotated coordinate system by taking a projection of the object with respect to a second (orthogonal) axis, identifying extrema therein, and outputting the locations of those extrema.

Another aspect of the invention provides methods as described above further including the steps of determining moments of the object and basing the angle of the rotated coordinate system on the angular orientation of those moments. Where the principal moments of the object are selected, the invention in this aspect can be used to identify extrema corresponding to the smallest bounding box surrounding a rotated object.

In another aspect, the invention provides methods as described above further including the step of identifying the object in the image by distinguishing it from its background and/or the other objects in the image.

This can be done by segmenting the image, for example, by (1) thresholding the image to find intensity values that differentiate the object and/or its edges from other features in the image, or (2) detecting edges of the object in the image. The aforementioned projections can be taken of the segmented image, e.g., in instances where "grey scale" resolution is not essential to extrema identification. Alternatively, the segmented image can be applied as a mask to the original image to isolate a grey scale representation of the object. Projections can then be taken of that grey scale representation.

The object can also be identified by connectivity analysis, with optional ran-length encoding to facilitate the analysis. As above, projections can be taken using the image resulting from connectivity analysis, e.g., where "grey scale" resolution is not essential to extrema identification. Alternatively, the image resulting from connectivity analysis can be used as a mask to the original image to isolate a grey scale representation of the object. Projections can be taken of that grey scale representation, as well.

These and other aspects of the invention are evident in the attached drawings and in the description and claims that follow.

As those skilled in the art will appreciate from the discussion herein, the invention has wide application in industry and research applications. It can be used to identify rapidly, and without undue consumption of resources, extrema of objects in rotated reference frames. Bounding boxes generated from those extrema, for example, can be used to confine the images regions that must be analyzed to identify characteristics of the objects and, thereby, facilitate determination of object orientation in automated assembly and manufacturing processes.

BRIEF DESCRIPTION OF THE DRAWINGS

A more complete understanding of the invention may be attained by reference to the drawings in which.

DETAILED DESCRIPTION OF THE ILLUSTRATED EMBODIMENT

Figure 1:
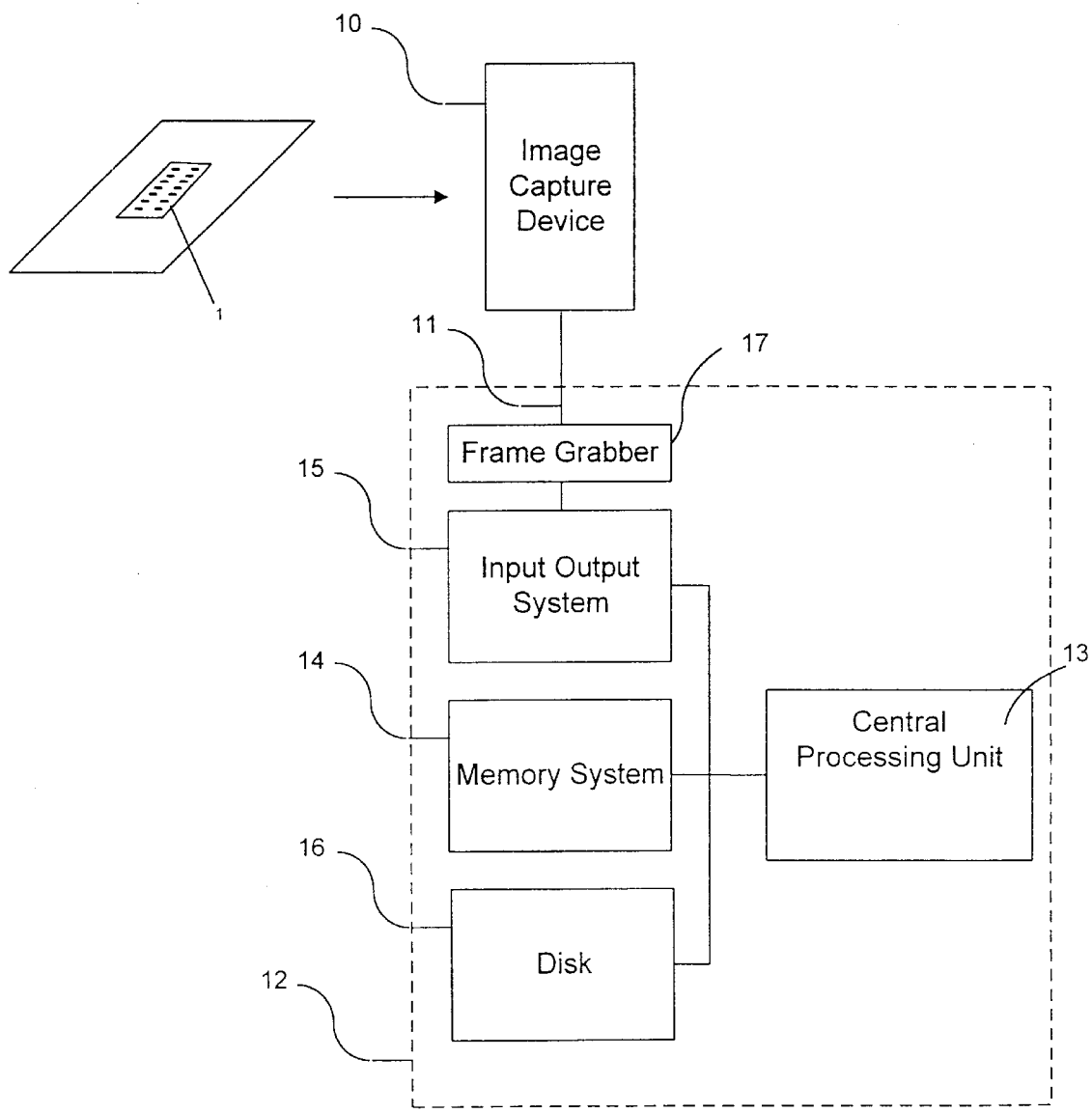
FIG. 1 depicts a machine vision system for use in practice of the invention.

FIG. 1 illustrates a system 5 for determining object extrema according to the invention. The system 5 includes a capturing device 10, such as a conventional video camera or scanner, that generates an image of a scene including an object 1. Image data (or pixels) generated by the capturing device 10 represent, in the conventional manner, the image intensity (e.g., color or brightness) of each point in the scene at the resolution of the capturing device.

The digital image data is transmitted from capturing device 10 via a communications path 11 to an image analysis system 12. This can be a conventional digital data processor, or a vision processing system of the type commercially available from the assignee hereof, Cognex Corporation, programmed in accord with the teachings hereof to perform object extrema identification. The image analysis system 12 may have one or more central processing units 13, main memory 14, input-output system 15, and disc drive (or other mass storage device) 16, all of the conventional type.

Image analysis system 12 also includes a frame grabber 17 for buffering and storing (in main memory 14 or disc drive 16) image data transmitted from a capturing device 10. Images generated by frame grabber 17 have a reference frame (or coordinate system) that is defined by the rasterized data received from capturing device 10. As will be appreciated by those skilled in the art, that reference frame is defined by the orientation of the scan lines transmitted from the capturing device. The frame grabber 17 is of a conventional, commercially available type.

The system 12 and, more particularly, central processing unit 13, is configured by programming instructions according to the teachings hereof for identification of object extrema, as described in further detail below. Those skilled in the art will appreciate that, in addition to implementation on a programmable digital data processor, the methods and apparatus taught herein can be implemented in special purpose hardware.

Figure 2:
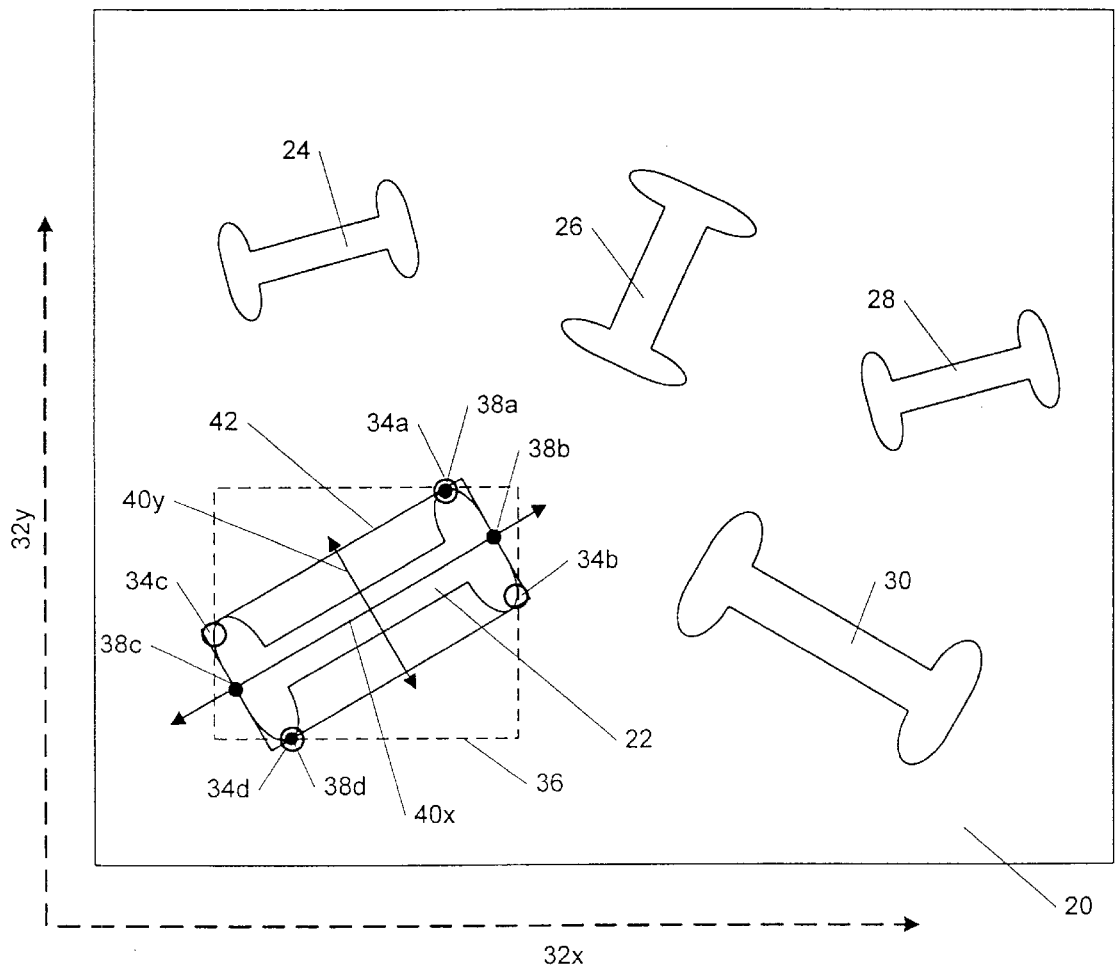
FIG. 2 depicts an image acquired for processing by the vision system of FIG. 1 in accord with the invention.

FIG. 2 depicts an image 20 of the type processed by the illustrated embodiment to identify extrema of objects therein. Illustrated image 20 depicts 5 barbell-shaped objects 22, 24, 26, 28, 30. The image 20 is aligned with the reference frame of the equipment that acquired it, to wit, capture device 10 and frame grabber 17. That reference frame is represented by axis 32x, 32y.

FIG. 2 further depicts the extrema 34a, 34b, 34c, 34d of the type identified by conventional blob analysis vision tools. Those extrema are the leftmost (34c), rightmost (34b), uppermost (34a), and lowermost (34d) points on object 22 with respect to the reference frame of the acquisition equipment, i.e., that defined by axis 32x, 32y. The extrema 34a–34d define a bounding box 36 that is aligned with the acquisition reference frame (and axes 32x, 32y) and that includes leftmost, rightmost, uppermost and lowermost sides whose positions are defined by the corresponding extrema 34a–34d.

The method of the invention permits identification of object extrema with respect to reference frames (or coordinate axis) that are rotated with respect to that of the acquisition equipment. One such set of extrema are illustrated in FIG. 2 as points 38a, 38b, 38c, 38d. These extrema 38a–38d define the leftmost, rightmost, uppermost and lowermost points of object 22 with respect to a rotated reference frame represented axes 40x, 40y. The method permits extrema to be determined for a reference frame rotated at any angle with respect to the reference frame of the acquisition equipment. Put another way, axes 40x, 40y may be rotated at any angle with respect to axes 32x, 32y. In the illustration, that rotated reference frame is aligned with the principal moments of the object 22.

As further shown in FIG. 2, extrema 38a–38d define a bounding box 42 that is aligned with the rotated reference frame, i.e., with axes 40x, 40y.

Figure 3:
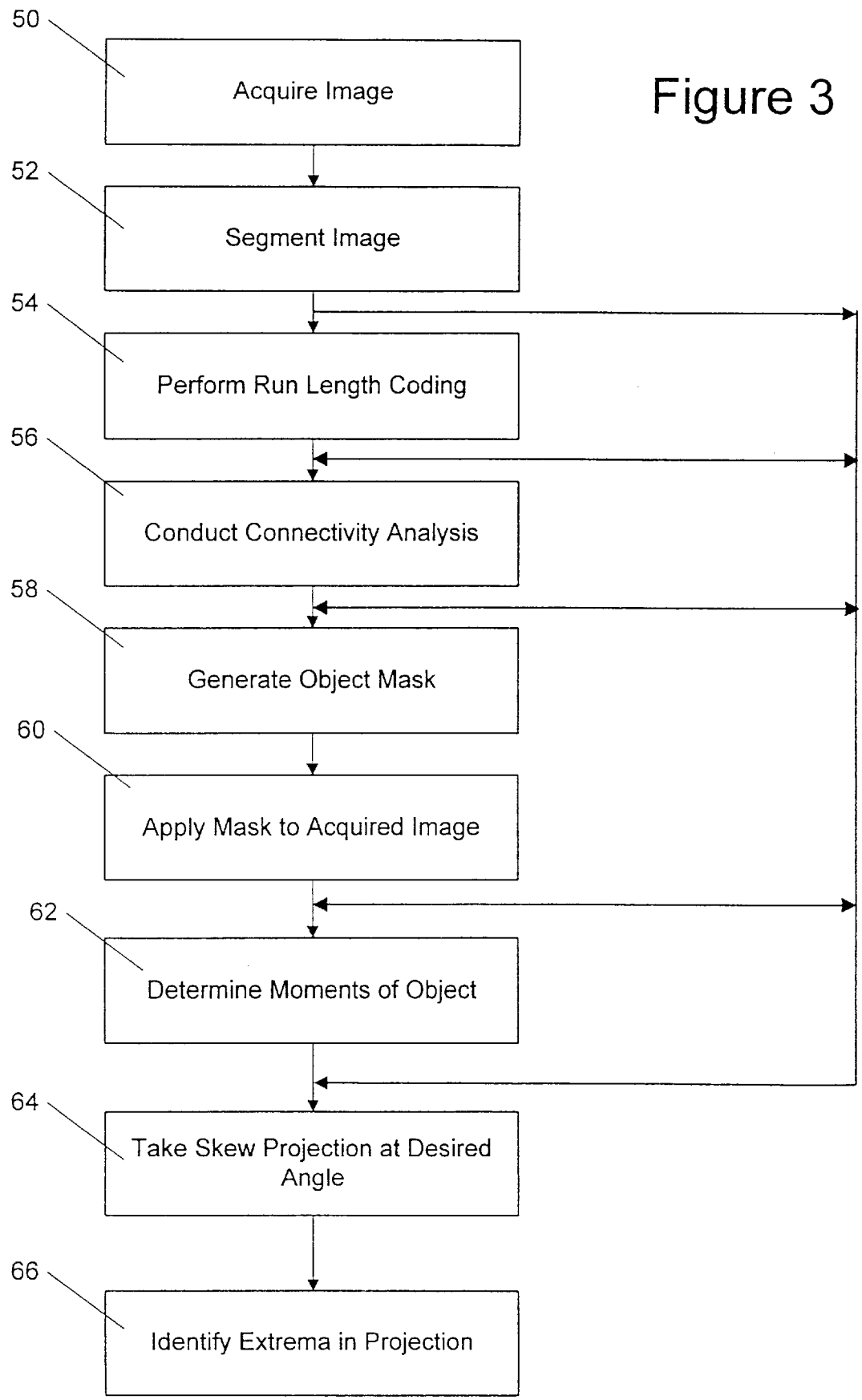
FIG. 3 depicts a methodology according to the invention for analyzing an image to determine extrema of an object therein with respect to a rotated reference frame.

FIG. 3 illustrates a preferred method for determining extrema 38a–38d with respect to the rotated reference frame of axes 40x, 40y. The illustrated method, additionally, includes steps for isolating object 22 from the background of image 20, as well as other objects therein, e.g., objects 24–30.

In step 50, the illustrated method acquires an image from the image acquisition equipment, e.g., capture device 10 and frame grabber 17 in the conventional manner in the art.

In step 52, the method segments the image to distinguish one or more objects of interest (e.g., object 20) from the background (and from other objects). This is preferably done by thresholding the image, i.e., by taking a histogram of the image (i.e., tallying the number of pixels at each intensity value) and analyzing that histogram to identify intensities associated with the object(s) of interest. If those objects consist predominantly of one intensity (e.g., grey value or color) and the background consists predominantly of another intensity, then there will be two distinct distributions in the histogram.

In a preferred double thresholding technique, the intensities in the histogram are divided into three regions, 1) intensities of the objects of interest, 2) intensities of the background and 3) intensities in the transition from the objects of interest to the background. These three regions can be defined by two intensity thresholds, one on either side of the intensity transition region. Pixels that are the color of the object are assigned a value of one (1). Pixels that are the color of the background are assigned a value of zero (0). Pixels that are in the transition region are assigned a fractional value between zero and one, proportional to how close their grey values are to the background and object thresholds.

This preferred double thresholding technique offers advantages over conventional techniques that rely on a single threshold. The advantages are more accurate estimates of area, extrema, and any other measurements that depend on image moments then are possible with single threshold techniques.

An alternative technique for thresholding is described in copending, commonly assigned U.S. patent application Ser. No. 08/581,975, for Machine Vision Method and Apparatus for Edge-Based Image Histogram Analysis, filed on Jan. 1, 1996, the teachings of which are incorporated herein by reference.

In step 52, the method can, alternatively, segment the image by edge detection. Thus, for example, the intensity of an edge pixel can be identified (e.g., via the techniques of copending, commonly assigned U.S. patent application Ser. No. 08/581,975, the teachings of which are incorporated herein by reference) and, then, that edge can be tracked (e.g., via the boundary tracking techniques taught in commonly assigned U.S. patent application Ser. No. 07/979,848, filed Nov. 23, 1992, the teachings of which are incorporated herein by reference).

As indicated in FIG. 3, the segmented image can be passed onward for processing at steps 64 and 66, where the skew projection and extrema are found. This may be preferred in instances where grey level resolution is not essential for finding those extrema. Alternatively, the segmented image can be passed onward for generation of an object mask in step 58. This is preferred where grey level resolution is desired for finding extrema.

In optional step 54, the method performs run length coding of the image. In this step, the thresholded image is converted from an array of thresholded grey values to a representation of runs of 1's and 0's. This new representation is more compact and is conducive to connectivity analysis and moment generation. Step 54 can be performed in a conventional manner known in the art. An understanding of a conventional technique may be obtained by reference to Horn, *Robot Vision* (MIT Press, 1986) at § 3.5, the teachings of which are incorporated herein by reference.

For example, this step changes the representation of a raster line in the image of segmented pixels from "000011111000", where 0 means background and 1 means object to a representation of 4×0's, 5×1's, 3×0's or as even more compactly as "453". Another equivalent way of representing the run-length encoded line is 5:5 which means 5×1's starting at the fifth pixel. For the purpose of run length encoding, the fractional object pixels are treated as 1's, although in the preferred embodiment the fractional pixels are counted as fractional pixels in the run length encoded image. That is, in additional to the number of 1's, each run description includes the total fractional pixel sum.

One way to accomplish the run length encoding is to count the 1's in the thresholded image and record each such count and its starting location. These counts and locations are the run-length encoded representation. Preferably, the thresholded image is first converted into a packed binary format in hardware and, then, the packed binary image is converted into a run length encoded format by counting and recording locations. In a packed binary format, each group of 8 pixels is represented as a number between 0 and 255.

In step 56, the illustrated method conducts connectivity analysis on the original image (if optional step 54 is not taken) or on the run length coded image (if optional step 54 is taken). This identifies the discreet objects in the original image, e.g., objects 22–30, by placing labels on all of the pixels with 1's. Each group of connected 1's gets a distinct label. There are as many labels as there are different groups of connected 1's. This is conducted in the conventional manner known in the art, e.g., as described in Section 4.1 of Horn, supra, the teachings of which are incorporated herein by reference.

Immediately following connectivity analysis, the moments of all objects can be calculated, e.g., in the manner described in Chapter 4 of Horn, supra, the teachings of which are incorporated herein by reference. In a preferred embodiment, moment calculations (other then the zeroth moment) are deferred because performing such calculations, during step 56, does not allow fractional pixel processing.

As indicated in FIG. 3, the segmented image can be passed onward for processing at steps 64 and 66, where the skew projection and extrema are found. This may be preferred in instances where grey level resolution is not essential for finding those extrema. Alternatively, the segmented image can be passed onward for generation of an object mask in step 58. This is preferred where grey level resolution is desired for finding extrema.

In step 58, the method generates a mask from the run length encoding to facilitate separating from the image a specific object of interest, e.g., object 22. To this end, it will be appreciated that the result of connectivity analysis is a "labelled" image or a "labelled" run length coding that identifies each pixel in the original image as being part of the background (e.g., label "0") or as being part of a object (each of which has its own distinct label, e.g., "1", "2", "3", etc.). These labels can be thought of as a composite mask for all of the objects in the original image.

The labelled image or labelled run length coding can be used to create a mask—or they can be treated as masks directly. For example, by selectively considering the pixels corresponding to one label (and, therefore, one object) at a time, the pixels from that one object are separable from those of all other objects.

In step 60, the mask is applied to the acquired image 20 to segregate the object of interest, e.g., object 22. This step can be performed in the conventional manner in the art.

Preferably, steps 58 and 60 are combined to segregate the object by (1) selecting one of the labels, e.g., label number 8, (2) creating a new image by copying all of the pixel intensity values corresponding to that label (e.g., label number 8) into a new image, and (3) setting all of the other pixels in the new image to 0.

In step 64, the method takes a projection of the object at a desired angle with respect to the reference frame of the acquisition equipment, e.g., at the reference frame defined by axis 40x, 40y. The projection converts a two dimensional image into a one dimensional signal by summing two dimensional pixels into individual elements of the one dimensional signal.

In the preferred embodiment, the projection technique used is skewed projection. If the projection is to be done at the angle of the principal moments of inertia of each object, the principal moments of inertial must be estimated from the second moments of the two dimensional image as described in Horn section 3.2.2. Finding the second moments can be done from three projections, at 0 degrees, 90 degrees, and 45 degrees as described in Horn section 3.3, the teachings of which are incorporated herein by reference.

Projections at all angles are done using fixed angle component projections. That is, each element in the one dimensional signal is the result of summing two dimensional pixels oriented at the same angle. If the angle is 0 degrees, each element in the one dimensional signal is the result of summing a single column in the two dimensional image. Each different one dimensional signal element is the sum of a different column with neighboring elements containing sums of neighboring columns. If the angle is 90 degrees, each element in the one dimensional signal is the result of summing a single row in the two dimensional image.

At angles that are not multiples of 90 degrees, there are several ways of doing projections depending on the interpolation technique used. These techniques which are well known in the art include nearest neighbor interpolation and bilinear interpolation. A variant of nearest neighbor interpolation is skewed interpolation. In a preferred embodiment, the skew projection is done using a special purpose integrated circuit of the type described in U.S. Pat. No. 4,972, 359. A description of preferred software for operating such a hardware device is attached in the Attachment I.

The preferred embodiment takes two projections: one at the desired angle, the second at an angle 90 degrees to the first projection.

Preferably, all of the projections described in this section are grey-level projections, not binary projections. As described in the binarization step this means that some of the pixels contribute fractional weight towards the projections. Therefore, moment calculations are not restricted to whole pixel values and can be more accurate then moments calculated with binary projections.

The angle used in step 62 can be obtained from any of many sources. For example, it can be entered by the user, e.g. at the keyboard. Alternatively, it can be based on the angle of the principal moments of the object, as described above.

In step 66, the method identifies extrema in the projection. Each of the two dimensional projection signals contains two extrema at that projection angle. The location of the first pixel in the projection corresponds to the location of the first pixel in the bounding box defined by the projection angle. The last pixel in the projection corresponds to the location of the last pixel in the bounding box defined by the projection angle. The first and last pixel in the second projection corresponds to the location of the first pixel in the bounding box at 90 degrees and the last pixel in the projection corresponds to the location of the last pixel in the bounding box at 90 degrees.

In a preferred embodiment, all of the projections that are used in this section to calculate extrema are grey-level projections, not binary projections. As described above, this means that some of the pixels contribute fractional weight towards the projections. Therefore, extrema calculations are not restricted to whole pixel values and can therefore be more accurate then extrema calculated with binary projections. The location of the first pixel can therefore be at the location where two fractional pixels each contributed one half.

Preferably, the location of the first and last pixels are calculated relative to the locations of the center of mass of the object. The center of mass of the object is found from the same two projections as the extrema using techniques described in Horn section 3, the teachings of which are incorporated herein by reference.

A still better understanding of the preferred technique for identifying extreme in the projection may be attained by reference to the software listing in Attachment II.

Described above are improved machine vision methods meeting the objects set forth herein. It will be appreciated that the embodiments shown in the drawings and described above are illustrative only. Further embodiments incorporating modifications within the ken of those of ordinary skill in the art are also encompassed by the invention. By way of non-limiting example, it will be appreciated that the invention can be embodied in special purpose hardware, as well as software-based systems of the type described above. Furthermore, the methods described above can be incorporated in, or used in conjunction with, a variety of machine vision functions, including the above-described blob analysis tool.

As noted above, the invention has wide application in industry and research applications. It can be used to identify rapidly, and without undue consumption of resources, extrema of objects in rotated reference frames. Bounding boxes generated from those extrema, for example, can be used to confine the images regions that must be analyzed to identify characteristics of the objects and, thereby, facilitate determination of object orientation in automated assembly and manufacturing processes.

ATTACHMENT I to patent application for

MACHINE VISION METHODS FOR IDENTIFYING EXTREMA OF OBJECTS IN ROTATED REFERENCE FRAMES

Software Description

Copyright © Cognex Corporation

7 Projection Tools

Projection Tool

Viewing a projection of an image is like viewing the image from one of its edges. Projection angles must range between -90 exclusive and 90, inclusive. For other angles, you add or subtract 180 to or from the specified angle to bring it within this range. For example, the projection at -120 is the same as the projection at 60. An image that is projected at 0.0 is projected onto a line parallel to the x-axis; an image that is projected at 90.0 is projected onto a line parallel to the y-axis. Figure 180 shows a two-dimensional image and its one-dimensional projections at 0 and at 90.

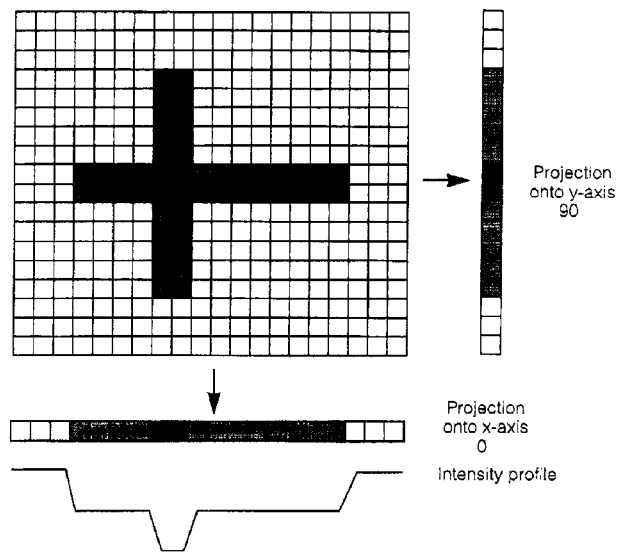

Figure 180. Two-dimensional image and its one-dimensional projections at 0 and +90

Mathematically, the x (0°) and y (90°) projections of an image may be expressed as:

$$\text{XProjection}(x_i) = \sum_{j=0}^{j=(h-1)} I(i,j)$$

$$\text{YProjection}(y_j) = \sum_{i=0}^{i=(w-1)} I(i,j)$$

where:

XProjection($x_i$) is the $i^{th}$ element of the x projection

YProjection($x_j$) is the $j^{th}$ element of the y projection

I(x,y) is the grey value of pixel (x,y)

h is the image height w is the image width

You can derive a *normalized projection* of an image by dividing the grey value of each pixel in the projection by the number of source pixels contributing to it. See the section *Function cpro_weights()* on page 352. Also, the function cip_sample(), which performs spatial averaging, provides a fast alternative to obtaining a normalized projection along the x- and y-axes. See *Chapter 2, Basic Image Processing*, for more information on cip_sample().

Creating a Projection

When you create a projection, you first map the pixel intensities in the original image to values that emphasize the important information in the image and de-emphasize noise. Selecting the right type of mapping function is important. See *Chapter 3, Pixel Mapping*, for details on choosing the appropriate mapping function for your image.

Each mapped pixel is then summed into a projection *bin* that becomes a pixel in the projected image. Each pixel in the original image contributes to only one bin and therefore to only one pixel in the projected image.

To determine which pixels are projected into a specific bin, the projection function creates columns that are the width of the projection bins, and that are perpendicular to the projection line. You specify the angle of the projection line. Each column represents a projection bin. When you project an image, each pixel is summed in the bin into which its

7 Projection Tools origin (upper left corner) falls. When a pixel's origin falls on the border between bins, the pixel contributes to the larger numbered bin. The projection function does not interpolate pixel values. Projections at 0.0 and 90.0 are optimized for speed.

Figure 181 illustrates how pixels fall into bins in cases where the angle of projection is negative.

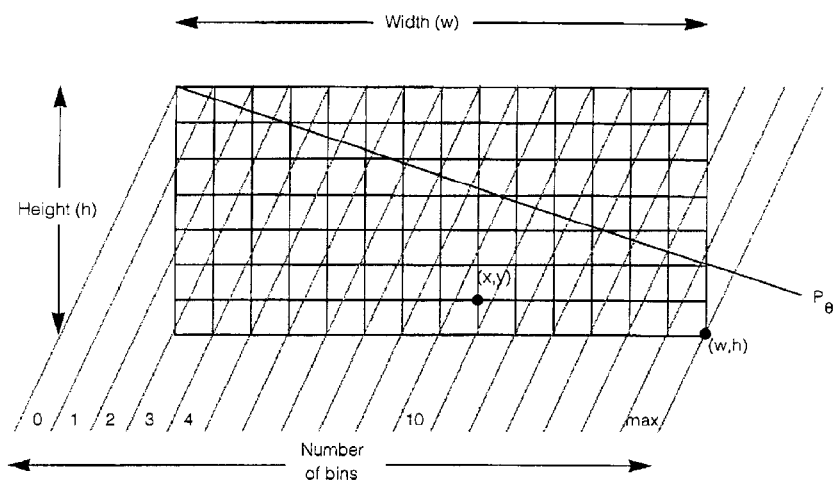

Figure 181. Bins for a projection with a negative angle

Projection Tools 7

Figure 182 illustrates how pixels fall into bins in cases where the angle of projection is positive.

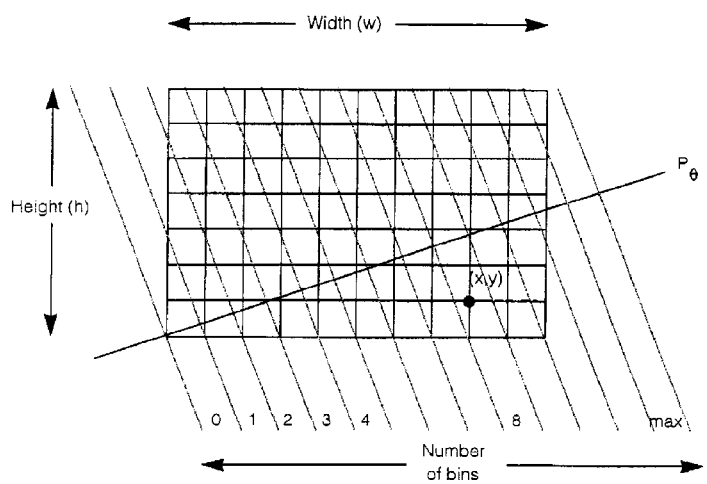

*Figure 182. Bins for a projection with a positive angle*

The scale of pixels in the original image is not, in general, preserved in the projected image. Rather, the width of each bin (or pixel) in the projection falls off as the cosine of the angle of projection over the interval -45 to +45. It then rises as the sine of the angle, achieving unity at 90.

The projection tool operates directly only at angles between -45 and +45. When the angle of projection exceeds the absolute value of 45, the projection function transposes the source into the destination as follows:

$$D(x, y) = S(y, x)$$

where:

D is the destination

S is the source

Image Processing 347

7 Projection Tools

Transposing the image substantially increases the time required to make the projection. Therefore, if you are making many projections of the same image and the angles of projection exceed the absolute value of 45, you may want to transpose the image yourself before calling the projection function. See *Chapter 2, Basic Image Processing*, for more details on cip_transpose().

Calculating the Number of Bins

For angles of projection between -45 and 0, the bin number Bn for pixel I(x,y) may be computed as:

$$B_n = x + y|\tan\theta|$$

For angles between 0 and +45, the equation is:

$$B_n = x + (h - y - 1)\tan\theta$$

To compute the total number of projection bins required by an image, Nb:

$$Nb = (int) (w + ((h-1) * |\tan(\theta)|))$$

For example, the computation of the number of projection bins required by an image of width 20, and height 30, at an angle of -35 would be:

$$20 + (30 - 1) * \tan(35.0)$$

and the computation of the projection bin for a pixel at (x,y) would be:

$$(int) (x + y * \tan(35.0))$$

If the projection angle were 75.0, the image would have to be transposed because the projection functions work directly only on angles between -45 and +45. Also, you would subtract 75 from 90 to arrive at the effective angle between -45 and +45. Then, the computation for the number of bins would be:

$$(int) (30 + (20 - 1) * \tan(90.0 - 75.0))$$

and the computation of the projection bin for a pixel at (x,y) would be:

$$(int) (x + (30 - y - 1) \tan(15.0))$$

There is also a macro for computing the number of bins required by an image:

```
#define CPRO_BINS(width,height,tangent)\
    ((width)+((((height)-1*abs((tangent)))+)x8000)>>16))
``` where:

*width* is the image width

Projection Tools 7

*height* is the image height

*tangent* is the angle of the image given by its tangent in CIA_31_16 format

Function cpro_project()

The function cpro_project() projects a source image onto a line and returns a pointer to the destination (projected) image.

```
include <projectn/cpro.h> cip_buffer *cpro_project(cip_buffer *src, cip_buffer *dst,
    cmap_params *params, double theta);
```

- *src* points to the image to be projected.
- *dst* points to the image representing the line onto which the source image is to be projected. If you do not supply a destination image, one is created. The created image has 32-bit pixels, and a height equal to 1. Its width is calculated for you in the manner described above.

The projection is written to the first row of the destination image. Therefore, its height need be no greater than 1. Also, the supplied destination image must be wide enough and its pixel depth great enough, to hold the largest projected pixel value. If the destination image is too narrow, *CPRO_ERR_WIDTH* is thrown. The maximum number of pixels contributing to a single bin can be estimated as shown below (h is the height, w is the width):

for angles $0 <= |\theta| <= 45$ $$N = \frac{h}{|\cos\theta|}$$

for angles $45 <= |\theta| <=90$ $$N = \frac{w}{|\sin\theta|}$$

A limiting value for any angle is:

$$\sqrt{2}(MAX(w,h)) + 1$$

- *params* points to a cmap_params structure that specifies the type of mapping function and parameters to be used in creating the map used for the projection. *params* must not be NULL. See *Chapter 3, Pixel Mapping*, for details on selecting the appropriate mapping function for your image.
- *theta* is the angle of the line onto which the source image is projected.

4 Caliper Tool
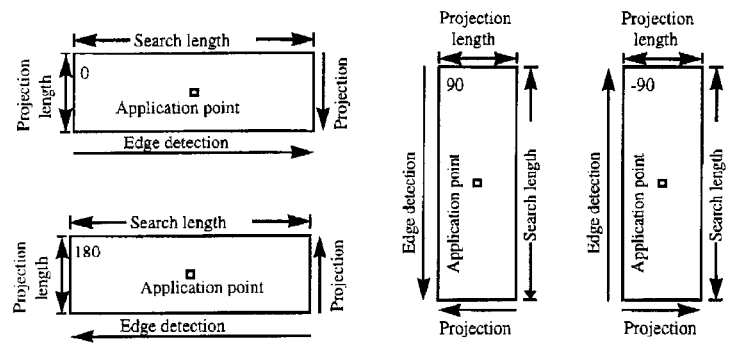
*Figure 108. The caliper window at 90 rotations*
Skewed Window Projection
Figure 109 shows a -15 caliper window with window rotation *disabled*. In this case, the Caliper Tool creates a "skewed" window and projects it along the angle of skew into a one- dimensional image.

CaliperTool 4

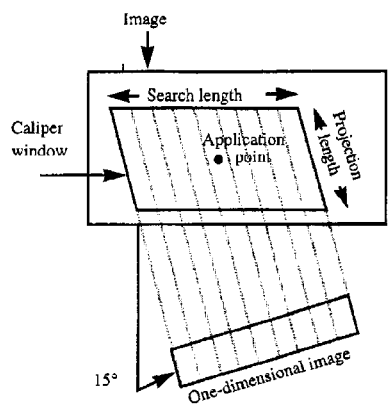

*Figure 109. Skewed window projection*

When window rotation is disabled, you specify how the skewed window will be projected: with or without *interpolation*. Interpolation increases accuracy at the expense of execution speed.

When you use a skewed window without interpolation for projection, the pixels in the source image are summed along the angle of skew as shown in Figure 110. Each pixel in the two-dimensional image contributes to one pixel in the one-dimensional image. In Figure 110, those pixels containing the number 1 contribute to the destination pixel containing the number 1, and so on.

4 Caliper Tool

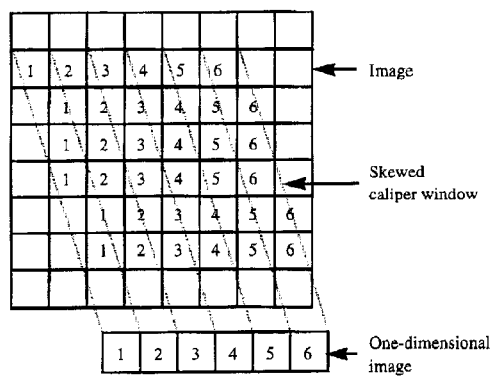

*Figure 110. Skewed window projection without interpolation*

When you use a skewed window with interpolation for projection, the skewed window is transformed into a rectangular window before projection. The transformation is performed by cip_transform(), which uses several neighboring pixels from the two-dimensional image to calculate the pixel value for the one-dimensional image. See *Chapter 2, Basic Image Processing*, in the *Image Processing* manual for a complete description of the function cip_transform().

Caliper Tool 4

Rotated Window Projection

Figure 111 shows a -15 caliper window with window rotation *enabled*. In this case the Caliper Tool rotates the two-dimensional image and projects it into a one-dimensional image.

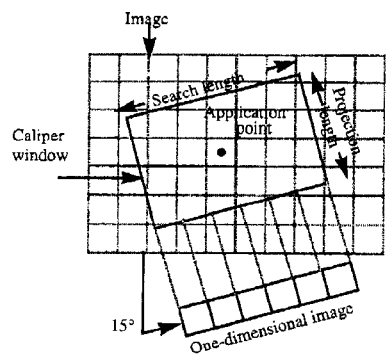

*Figure 111. Rotated window projection*

Choosing the Projection Type

The choice of *skewed* or *rotated* projection depends on the angle of the edge or edge pair of interest in the image and the remaining content of the image. If the rotation angle is close to 90 or if a skewed image will contain enough of the edge or edge pair of interest to generate strong edges, you can use *skewed projection* to speed program execution. Figure 112 shows an image, a caliper window and the one-directional image that results from projection. The skewed window contains enough edge information, so skewed projection may be used.

ATTACHMENT II to patent application for

MACHINE VISION METHODS FOR IDENTIFYING EXTREMA OF OBJECTS IN ROTATED REFERENCE FRAMES

Software Listing

Copyright © Cognex Corporation

```c
/* This file contains code to calculate blob extrema in any coordinate */
/* system. The function call is meant to be made from deep inside      */
/* cblob_one() and/or cblob_two(), but if you really wanted to you     */
/* could call it yourself. */
/* */

/* Find the first pixel in a given oriented projection and at 90 */
/* degrees to that direction starting from the beginning and end */
/* of a line. */
void cblob_angle_extrema(image, theta, cmx_b, cmy_b, p, weight, left, right,
up, down)
    cip_buffer *image;
    double theta;
    double cmx_b, cmy_b;
    cblob_params *p;
    int weight;
    double *left, *right, *up, *down;
{
    cip_buffer *dst1 = NULL, *dst2 = NULL;
    double cmx, cmy;
    z_histogram *xh = NULL, *yh = NULL;
    cmap_params cmp;
    double rangle1, rangle2;
    double angle_correction1 = 1.0, angle_correction2 = 1.0;
    double bin_theta1, bin_theta2;
    double lleft, lright, lup, ldown;
    int first1, first2, last1, last2;
    double first1d, first2d, last1d, last2d;
    double cmbin1, cmbin2;
    int reverse1 = 0, reverse2 = 0;
    int swapxy1 = 0, swapxy2 = 0;
    int i, *iptr, *fptr;
    int nbins1, nbins2;
    double abstan1, abstan2;
    cct_signal sig;

NO_REGISTER(dst1);
    NO_REGISTER(dst2);
    NO_REGISTER(xh);
    NO_REGISTER(yh);
```

```
    /* Install catch handler */
    if (sig=cct_catch(0)) goto bottom;

/* Convert from blob coordinate system to graphics coordinate system. */
    cmx = cmx_b + 0.5;
    cmy = cmy_b + 0.5;

cmp.wf = p->wf;
    cu_copy(&p->mp, &cmp.mp, sizeof(cmap_map_data));

/* Call cpro_project() at angle and at (angle + 90) */
    dst1 = cpro_project(image, dst1, &cmp, theta);
    dst2 = cpro_project(image, dst2, &cmp, theta + 90.);

/* Find the first grey-level weighted non-zero bin.
     */
    xh = (z_histogram *)cz_make_hist(dst1->width);
    cu_copy(dst1->rat[0], xh->bins, dst1->width * 4);
    xh->h.range = xh->h.bins = dst1->width;
    xh->h.valid = n_valid;

first1d = cz_ffs_3116_d( cz_left_ic_fp( xh, cz_ffs_dxi( p-> xmin, weight
) ) );

/* Find the last grey-level weighted non-zero bin.
     */
    last1d = cz_ffs_3116_d( cz_right_ic_fp( xh, cz_ffs_dxi( p-> xmax, weight
) ) );

/* Find the first grey-level weighted non-zero bin.
     */
    yh = (z_histogram *) cz_make_hist(dst2->width);
    cu_copy(dst2->rat[0], yh->bins, dst2->width * 4);
    yh->h.range = yh->h.bins = dst2->width;
    yh->h.valid = n_valid;

first2d = cz_ffs_3116_d( cz_left_ic_fp( yh, cz_ffs_dxi( p-> ymin, weight
) ) );

/* Find the last grey-level weighted non-zero bin.
     */
```

```
    last2d = cz_ffs_3116_d( cz_right_ic_fp(  yh, cz_ffs_dxi( p-> ymax, weight
) ) );

/* Find the bin corresponding to the center-of-mass in each */
    /* projection. */
    bin_theta1 = theta;
    while (bin_theta1 < -45.) bin_theta1 += 360.;
    while (bin_theta1 >= 315.) bin_theta1 -= 360.;

bin_theta2 = bin_theta1 + 90.;
    if (bin_theta2 >= 315.) bin_theta2 -= 360.;

/* Do the right thing for each octant */
    if (bin_theta1>=-45. && bin_theta1 <= 0.)          {
      swapxy1 = 0;
      swapxy2 = 2, reverse2 = 1, bin_theta2 = 90. - bin_theta2;
    } else if (bin_theta1>0. && bin_theta1 <= 45.)  {
      swapxy1 = 3;
      swapxy2 = 0, reverse2 = 0, bin_theta2 = 90. - bin_theta2;
    } else if (bin_theta1>45. && bin_theta1<=90.)    {
      swapxy1 = 2, reverse1 = 0, bin_theta1 = 90. - bin_theta1;
      swapxy2 = 1;
    } else if (bin_theta1>90. && bin_theta1<135.)    {
      swapxy1 = 1, reverse1 = 1, bin_theta1 = 90. - bin_theta1;
      swapxy2 = 3;
    } else if (bin_theta1>=135. && bin_theta1<=180.) {
      swapxy1 = 0, reverse1 = 1;
      swapxy2 = 2, bin_theta2 = 270. - bin_theta2;
    } else if (bin_theta1>180. && bin_theta1<=225.){
      swapxy1 = 3, reverse1 = 1;
      swapxy2 = 0, reverse2 = 1, bin_theta2 = 270. - bin_theta2;
    } else if (bin_theta1>225. && bin_theta1<=270.) {
      swapxy1 = 2, reverse1 = 1, bin_theta1 = 270. - bin_theta1;
      swapxy2 = 1, reverse2 = 1;
    } else if (bin_theta1>270.)                         {
      swapxy1 = 1, bin_theta1 = 270. - bin_theta1;
      swapxy2 = 3, reverse2 = 1;
    } rangle1 = bin_theta1 * PI / 180.;
    rangle2 = bin_theta2 * PI / 180.;
```

```
     angle_correction1 = fabs(cos(rangle1));
     angle_correction2 = fabs(cos(rangle2));
     abstan1 = fabs(tan(rangle1));
     abstan2 = fabs(tan(rangle2));

/* Calculate the bin number where (cmx, cmy) falls in first projection. */
     switch (swapxy1) {
     case 0:
       cmbin1 = cmx + cmy * abstan1;
       break;
     case 1:
       cmbin1 = cmy + cmx * abstan1;
       break;
     case 2:
       cmbin1 = (image->height - cmy) + cmx * abstan1;
       break;
     case 3:
       cmbin1 = cmx + (image->height - cmy - 1.) * abstan1;
       break;
     }
     /* Calculate the bin number where (cmx, cmy) falls in second projection.
*/
     switch (swapxy2) {
     case 0:
       cmbin2 = cmy + cmx * abstan2;
       break;
     case 1:
       cmbin2 = cmx + cmy * abstan2;
       break;
     case 2:
       cmbin2 = (image->height - cmy) + cmx * abstan2;
       break;
     case 3:
       cmbin2 = cmx + (image->height - cmy - 1.) * abstan2;
       break;
     }

/* Find the offset of the extrema from the center of mass. */
     lleft  = cmbin1 - first1d;
     lright = last1d - cmbin1;
     lup    = cmbin2 - first2d;
```

```
    ldown = last2d - cmbin2;

/* Normalize the results due to the angle error. */
    lleft  *= angle_correction1;
    lright *= angle_correction1;
    lup    *= angle_correction2;
    ldown  *= angle_correction2;

/* Check for reversal */
    if (reverse1) theta=lleft, lleft=lright, lright=theta;
    if (reverse2) theta=lup, lup=ldown, ldown=theta;

/* Stuff the results */
    if (left)  *left  = lleft;
    if (right) *right = lright;
    if (up)    *up    = lup;
    if (down)  *down  = ldown;

bottom:
    /* Free data structures */
    free(xh), xh=NULL;
    free(yh), yh=NULL;
    cip_delete(dst1), dst1=NULL;
    cip_delete(dst2), dst2=NULL;
    if (sig) cct_throw(sig);

return;
}
```

In view of the foregoing, what I claim is:

1. A method for determining extrema of an object in an image acquired by an image acquiring apparatus, where the image is aligned with a coordinate system of the image acquiring apparatus, the method comprising taking a first projection of the object with respect to a first axis of a specified coordinate system that is rotated with respect to the coordinate system of the image acquiring apparatus;

identifying in the first projection locations representing one or more extrema of the object; and outputting those one or more locations as indicative of extrema of the object with respect to the first axis of the specified coordinate system.

2. A method according to claim 1, comprising the steps of taking a second projection of the object with respect to a second axis of the specified coordinate system;

identifying in the second projection locations representing one or more extrema of the object; and outputting those one or more locations as indicative of extrema of the object with respect to a second axis of the specified coordinate system.

3. A method according to claim 1, comprising the steps of determining one or more moments of the object; and selecting the specified coordinate system as a function of an orientation of those moments.

4. A method according to claim 1, including a step for identifying the object by segmenting the image.

5. A method according to claim 4, wherein the segmenting step includes the step of a finding threshold intensity that distinguishes the object in the image.

6. A method according to claim 5, wherein the segmenting step includes the step of an additional threshold intensity that distinguish the object's edges in the image.

7. A method according to claim 6, wherein the segmenting step includes the step of proportionally counting the object's edges in determining an extrema of the object.

8. A method according to claim 6, comprising the steps of determining one or more moments of the object; and proportionally counting the object's edges in determining a moment of the object.

9. A method according to claim 4, wherein the segmenting step includes the step of finding edges of the object in the image.

10. A method according to claim 8, wherein the segmenting step includes the step of tracking the boundary of the object in order to find its edges.

11. A method according to claim 1, comprising a step for identifying the object by performing connectivity analysis on the image.

12. A method according to claim 1, comprising the steps of segmenting the image; and identifying the object by performing connectivity analysis on the segmented image.

13. A method according to any of claims 11 and 12, comprising the steps of generating a run length coding of the image; and performing the connectivity analysis using that the run length coding.

14. A method according to claim 1, comprising the steps of generating a mask; and applying the mask to the image to identify the object.

15. A method according to claim 14, wherein the step of generating the mask comprises the step of segmenting the image.

16. A method according to claim 15, wherein the segmenting step includes the step of a finding threshold intensity that distinguishes the object in the image.

17. A method according to claim 15, wherein the segmenting step includes the step of an additional threshold intensity that distinguish the object's edges in the image.

18. A method according to claim 17, wherein the segmenting step includes the step of proportionally counting the object's edges in determining an extrema of the object.

19. A method according to claim 17, comprising the steps of determining one or more moments of the object; and proportionally counting the object's edges in determining a moment of the object.

20. A method according to claim 15, wherein the segmenting step includes the step of finding edges of the object in the image.

21. A method according to claim 20, wherein the segmenting step includes the step of tracking the boundary of the object in order to find its edges.

22. A method according to claim 14, wherein the step of generating the mask comprises the step of performing connectivity analysis on the image.

23. A method according to claim 14, wherein the step of generating the mask comprises the steps of segmenting the image; and identifying the object by performing connectivity analysis on the segmented image.

24. A method according to any of claims 22 and 23, comprising the steps of generating a run length coding of the image; and performing the connectivity analysis using that the run length coding.

25. A method for determining extrema of an object in an image acquired by an image acquiring apparatus, where the image is aligned with a coordinate system of the image acquiring apparatus, the method comprising analyzing the image to generate a mask for the object;

applying the mask to the image to isolate the object from the image;

taking a first projection of the object with respect to a first axis of a specified coordinate system that is rotated with respect to the coordinate system of the image acquiring apparatus;

identifying in the first projection locations representing one or more extrema of the object; and outputting those one or more locations as indicative of a extrema of the object with respect to the first axis of the specified coordinate system.

26. A method for determining extrema of an object in an image acquired by an image acquiring apparatus, the method comprising analyzing the image to generate a mask for the object;

applying the mask to the image to isolate the object from the image;

determining one or more moments of the object;

taking a first projection of the object with respect to a first axis of a specified coordinate based on an orientation of those moments;

identifying in the first projection locations representing one or more extrema of the object; and outputting those one or more locations as indicative of a extrema of the object with respect to the first axis of the specified coordinate system.

27. A method according to claim 26, further comprising determining a location a center of mass of the object; and outputting the locations representing one or more extrema relative to the location of the center of mass of the object.

* * * * *